(12) United States Patent
Melin

(10) Patent No.: US 7,788,428 B2
(45) Date of Patent: Aug. 31, 2010

(54) MULTIPLEX MOBILE HIGH-DEFINITION LINK (MHL) AND USB 3.0

(75) Inventor: Tobias Melin, Harlosa (SE)

(73) Assignee: Sony Ericsson Mobile Communications AB, Lund (SE)

( * ) Notice: Subject to any disclaimer, the term of this patent is extended or adjusted under 35 U.S.C. 154(b) by 135 days.

(21) Appl. No.: 12/056,942

(22) Filed: Mar. 27, 2008

(65) Prior Publication Data
US 2009/0248924 A1 Oct. 1, 2009

(51) Int. Cl.
*G06F 13/12* (2006.01)
*G06F 13/38* (2006.01)
(52) U.S. Cl. .................... 710/62; 710/305; 710/313
(58) Field of Classification Search .................. None
See application file for complete search history.

(56) References Cited

U.S. PATENT DOCUMENTS

| | | | |
|---|---|---|---|
| 6,535,217 B1 * | 3/2003 | Chih et al. | 345/519 |
| 2004/0210715 A1 | 10/2004 | Harari et al. | |
| 2007/0223685 A1 * | 9/2007 | Boubion et al. | 380/2 |
| 2008/0007616 A1 * | 1/2008 | Baladhandayuthapani | 348/14.12 |
| 2008/0065796 A1 * | 3/2008 | Lee et al. | 710/71 |
| 2008/0084834 A1 * | 4/2008 | Stanek | 370/284 |
| 2008/0186403 A1 * | 8/2008 | Douillet | 348/461 |
| 2009/0088024 A1 * | 4/2009 | Ling et al. | 439/607 |
| 2009/0119733 A1 * | 5/2009 | Hill et al. | 725/117 |
| 2009/0125642 A1 * | 5/2009 | Overby et al. | 710/5 |
| 2009/0177820 A1 * | 7/2009 | Ranade et al. | 710/106 |
| 2009/0231485 A1 * | 9/2009 | Steinke | 348/425.1 |

FOREIGN PATENT DOCUMENTS

| | | |
|---|---|---|
| EP | 0 639 916 | 2/1995 |
| EP | 1 632 864 | 3/2006 |

OTHER PUBLICATIONS

International Search Report and Written Opinion for International Application No. PCT/IB08/02449 dated Feb. 2, 2009.
International Preliminary Report on Patentability for International Application No. PCT/IB08/02449 dated May 6, 2010.

* cited by examiner

*Primary Examiner*—Henry W Tsai
*Assistant Examiner*—Christopher A Bartels
(74) *Attorney, Agent, or Firm*—Renner, Otto, Boisselle & Sklar, LLP

(57) ABSTRACT

A portable electronic device includes a data input/output (I/O) circuit for communicating data to/from the electronic device, first logic operative to control the data I/O circuit in accordance with a first data transfer standard, wherein the first data transfer standard defines a first connector pin out, and second logic different from the first logic and operative to control the data I/O circuit in accordance with a second data transfer standard, wherein the second data transfer defines a second connector pin out different from the first connector pin out. The device also includes switching logic operative to selectively couple the first logic or the second logic to the data I/O circuit so as to enable operation of the data I/O circuit in accordance with the first data transfer standard or the second data transfer standard.

16 Claims, 5 Drawing Sheets

MULTIPLEX MOBILE HIGH-DEFINITION LINK (MHL) AND USB 3.0

TECHNICAL FIELD OF THE INVENTION

The present invention relates generally to electronic devices, such as electronic devices for engaging in voice communications, rendering media content, playing games, etc. More particularly, the invention relates to a system data port for use with electronic devices.

DESCRIPTION OF THE RELATED ART

Mobile and/or wireless electronic devices are becoming increasingly popular. For example, mobile telephones, portable media players and portable gaming devices are now in wide-spread use. In addition, the features and accessories associated with certain types of electronic devices have become increasingly diverse. To name a few examples, many electronic devices have cameras, text messaging capability, Internet browsing capability, electronic mail capability, video playback capability, audio playback capability, image display capability and handsfree headset interfaces. Exemplary accessories may also include headphones, music and video input players, etc.

To move data, such as movie clips, pictures, etc. between electronic devices, or to output audio and/or video data from an electronic device, a cable medium is often used that communicatively couples the electronic device to another device (e.g., a computer, another electronic device, a display device, an audio device, etc.). Such cable mediums typically include two connectors (one for each of the devices), a plurality of terminals in each connector, and electrical conductors coupling the terminals in each connector. To transfer data to/from the electronic device via the cable, one of the connectors is coupled to a receptacle (which also includes corresponding terminals) in the electronic device, and the other connector is coupled to a receptacle of the other device (e.g., a computer, electronic device, etc.). The connection completes one or more electrical circuits, which enables data to be transferred between the devices.

Various standards have been developed to enable electronic devices to exchange data, examples of which include universal serial bus (USB), FIREWIRE® peripherals (IEEE 1394), high-definition multimedia interface (HDMI), etc. In order to accommodate each of these standards, dedicated data ports are typically employed in the electronic device. For example, an electronic device that has both USB and FIREWIRE® peripherals capability will typically include a dedicated port for USB, and a dedicated port for FIREWIRE® peripherals.

A pervasive trend with electronic devices is the reduction in size and/or weight of such devices. For example, electronic devices employed in voice communications have reached dimensions that enable them to be comfortably placed in one's shirt or pants pocket, while at the same time packing the same or even more features than previous generation electronic devices.

SUMMARY

At present, USB is one of the most widely accepted means for exchanging data between electronic devices. It is likely that portable electronic devices, such as telephones, gaming devices, etc., will have USB interfaces for the foreseeable future.

A new interface standard (i.e., mobile high-definition link (MHL), which is compatible with the HDMI standard) is presently emerging on electronic devices. In order to provide connectivity for both USB and MHL, the electronic device requires specific ports and/or a relatively large number of pins to accommodate these connections. As the number of ports on the electronic device increase and/or as the size of the electronic devices decrease, the available space on the electronic device for other uses is reduced, which is undesirable.

A device and method in accordance with the present invention provides a single data port that can be used for multiple communication standards (e.g., USB 3.0 and MHL). In particular, different signal types (e.g., MHL signals and USB signals) can be multiplexed (e.g., physically switched or selected via software) so as to enable both communication standards on the same pin out (e.g., a standard USB 3.0 pin out). For example, the USB 3.0 standard will include a legacy 480 Mbit/s differential pair to maintain backward compatibility with USB 2.0, and two new unidirectional differential pairs for "super speed" mode (approximately 5 Gbit/s). For USB 3.0 and 2.0 data transfer, the differential pairs can be used as described under the USB 3.0 standard. For MHL data transfer, the legacy differential pair can be used as the MHL pixel clock, and the differential pair used of USB 3.0 transmission can be used for MHL pixel data. To control the data port in accordance with the specific standard, logic in accordance with each standard can be switched or selected to control I/O circuits of the data port so as to operate these circuits in accordance with the specific standard. This enables electronic devices to transfer data via multiple data transfer standards, while at the same time reducing the pin count and/or connector foot print required for these for interfaces.

According to one aspect of the invention, a portable electronic device includes: a data input/output (I/O) circuit for communicating data to/from the electronic device; first logic operative to control the data I/O circuit in accordance with a first data transfer standard, wherein the first data transfer standard defines a first connector; second logic different from the first logic and operative to control the data I/O circuit in accordance with a second data transfer standard, wherein the second data transfer defines a second connector different from the first connector; and switching logic operative to selectively couple the first logic or the second logic to the data I/O circuit so as to enable operation of the data I/O circuit in accordance with the first data transfer standard or the second data transfer standard.

According to one aspect of the invention, the portable electronic device includes a control circuit operatively coupled to the switch; a receptacle operatively coupled to the data I/O circuit; and a detection circuit operatively coupled to the receptacle and the control circuit. The detection circuit is configured to detect a type of connector coupled to the receptacle and to communicate the connector type to the control circuit, and the control circuit is operative to command the switching logic to select the first logic or the second logic based on the connector type.

According to one aspect of the invention, the device includes a logic interface circuit coupled between the switching logic and the data I/O circuit, wherein the logic interface translates data from a first format to a second format different from the first format.

According to one aspect of the invention, the receptacle includes at least two conductors coupled to the data I/O circuit, and the detection circuit includes an impedance measurement circuit configured to measure an impedance between the at least two conductors, wherein the detection circuit determines the connector type based on the measured impedance.

According to one aspect of the invention, the switching logic comprises a digital switch.

According to one aspect of the invention, the switching logic comprises software logic operative to select either the first logic or the second logic to control the data I/O circuit.

According to one aspect of the invention, the switching logic comprises a first input, a second input, and an output, the first input operatively coupled to the first logic, the second input operatively coupled to the second logic, and the output operatively coupled to the data I/O circuit.

According to one aspect of the invention, the switching logic further including a select input operative to selectively couple the first input or the second input to the output.

According to one aspect of the invention, the data I/O circuit is based on the USB 3.0 standard.

According to one aspect of the invention, the first logic is based on the USB 3.0 standard, and the second logic is based on the mobile high-definition link (MHL) standard.

According to one aspect of the invention, the data I/O circuit comprises at least three channels, each channel configured as a differential pair.

According to one aspect of the invention, the data I/O circuit includes a first data channel configured in accordance with the USB 2.0 standard, and second and third data channels configured in accordance with the USB 3.0 standard.

According to one aspect of the invention, the first logic is based on the USB 3.0 standard, and the second logic is based on the mobile high-definition link (MHL) standard, and when the second logic is selected, the first data channel is configured as a pixel clock channel in accordance with the MHL standard, and at least one of the second and third data channels (e.g., the differential pair used for USB transmission) is configured as a pixel data channel in accordance with the MHL standard.

According to one aspect of the invention, the device includes call circuitry for establishing two-way wireless communications.

According to one aspect of the invention, the electronic device is at least one of a mobile phone, pager, electronic organizer, personal digital assistant, or smartphone.

According to one aspect of the invention, the data I/O circuit, first logic, second logic and switching logic are formed on the same chip.

According to one aspect of the invention, a method of using a universal serial bus (USB) 3.0 data port to transfer data in accordance with two different data transfer standards, the data port including a legacy USB 2.0 data transfer circuit, and first and second USB 3.0 data transfer circuits, the method including: using the legacy USB 2.0 data transfer circuit and first and second USB 3.0 data transfer circuits in accordance with the USB 3.0 standard when a connector inserted in the data port is a USB connector; and using the legacy USB 2.0 data transfer circuit as a pixel clock circuit in accordance with the MHL standard, and using at least one of the first and second USB 3.0 data transfer circuits (e.g., the differential pair used for USB transmission) as a pixel data circuit in accordance with the MHL standard when the connector inserted in the data port is an MHL connector.

According to one aspect of the invention, the method includes determining if the connector inserted into the data port is a USB connector or a mobile high-definition link (MHL) connector.

According to one aspect of the invention, a method of using data port to transfer data in accordance with two different data transfer standards, the data port including a data input/out (I/O) circuit for data signals, the method including: configuring the data I/O circuit in accordance with a first data transfer standard when a connector inserted in the data port is a connector associated with the first data transfer standard; and configuring the data I/O circuit in accordance with the second data transfer standard when the connector inserted in the data port is a connector associated with the second data transfer standard.

According to one aspect of the invention, the method includes determining if a connector inserted into the data port is a connector associated with a first data transfer standard or a second data transfer standard.

According to one aspect of the invention, the first data transfer standard is universal serial bus (USB) 3.0, and the second data transfer standard is mobile high-definition link (MHL) standard.

According to one aspect of the invention, the data port includes a legacy USB 2.0 data transfer circuit, and first and second USB 3.0 data transfer circuits, the method further including: when the connector is determined to be a USB connector, using the legacy USB 2.0 data transfer circuit and first and second USB 3.0 data transfer circuits in accordance with the USB 3.0 standard; and when the connector is determined to be an MHL connector, using the legacy USB 2.0 data transfer circuit as a pixel clock circuit in accordance with the MHL standard, and using at least one of the first and second USB 3.0 data transfer circuits as a pixel data circuit in accordance with the MHL standard.

According to one aspect of the invention, determining includes measuring an impedance between terminals of the connector and, based on the measured impedance, concluding that the connector is a USB connector or an MHL connector.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

It should be emphasized that the terms "comprises" and "comprising," when used in this specification, are taken to specify the presence of stated features, integers, steps or components but do not preclude the presence or addition of one or more other features, integers, steps, components or groups thereof.

DETAILED DESCRIPTION OF EMBODIMENTS

Figure 1:
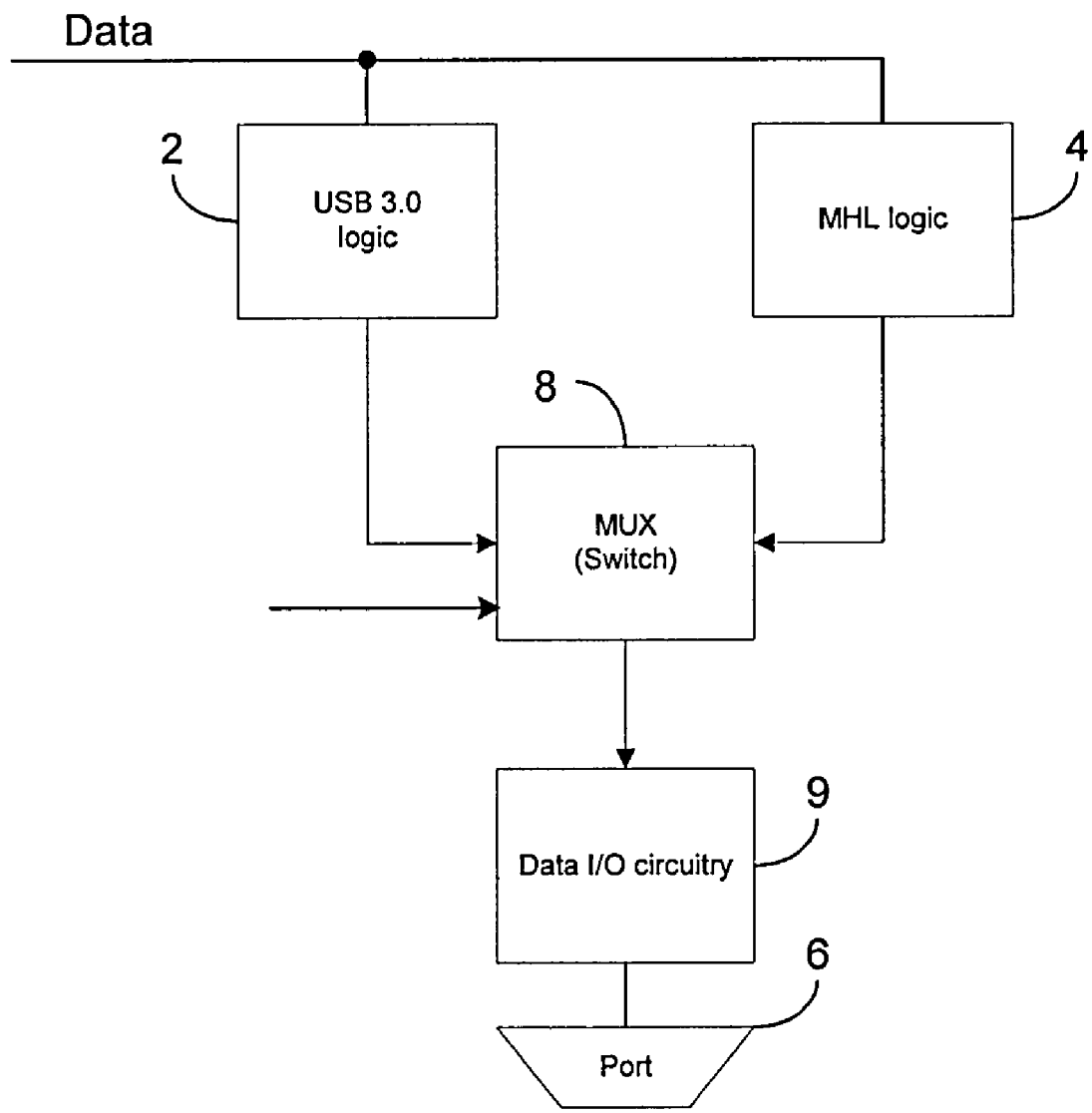
FIG. 1 is a block diagram illustrating exemplary switching of a USB 3.0 logic and an MHL logic to a common driver circuit for a multi-function data port in accordance with the invention.

Embodiments of the present invention will now be described with reference to the drawings, wherein like reference numerals are used to refer to like elements throughout. It will be understood that the figures are not necessarily to scale.

The interchangeable terms "electronic equipment" and "electronic device" include portable radio communication equipment. The term "portable radio communication equipment," which hereinafter is referred to as a "mobile radio terminal," includes all equipment such as mobile telephones, pagers, communicators, electronic organizers, personal digital assistants (PDAs), smart phones, portable communication apparatus, portable gaming devices, portable media devices (video and/or audio), and the like.

In the present application, embodiments of the invention are described primarily in the context of a mobile telephone. However, it will be appreciated that the invention is not intended to be limited to the context of a mobile telephone and may relate to any type of appropriate electronic equipment.

With the ever increasing storage capacity and functionality of electronic devices, faster data transfer interfaces are continuously being implemented on such electronic devices. Universal serial bus (USB) 3.0 is the latest version of the USB standard introduced for high speed data transfer, and it is likely that electronic devices will support this interface for the foreseeable future. Another emerging standard is mobile high-definition link (MHL), which is a proposed interface that provides the functionality of HDMI (high-definition multimedia interface), but with substantially less pins. MHL enables electronic devices to connect to high-definition displays and/or televisions.

It would be desirable to enable electronic devices such as mobile telephones, portable gaming devices, etc. to include both USB 3.0 functionality and MHL functionality. However, due to the shrinking size of electronic devices and the fact that different standards typically require different connectors, it can be difficult to find sufficient space on the device to accommodate both interfaces.

A device and method in accordance with the present invention enables a data port that includes a plurality of pins, such as USB 3.0 data port, to be used as a USB 3.0 data port and as a data port in accordance with another standard, such as the MHL standard. As will be described in more detail below, the two different communication standards (e.g., USB 3.0 and MHL) share a common data port or pin out by selectively controlling an input/output (I/O) circuit via different logic. By sharing the same data port, the free space on the electronic device is maximized and costs are minimized, all while enabling two different communication standards on the electronic device.

As is well known by those having ordinary skill in the art, USB signals are transmitted on a twisted pair data cable using half-duplex differential signaling. At present, there are two accepted USB standards (USB 1.1 and USB 2.0), and one proposed standard (USB 3.0). USB 1.1 has a maximum speed of 12 Mbit/s, USB 2.0 has a maximum speed of 480 Mbit/s, and USB 3.0 has a proposed maximum speed of 5 Gbit/s. To achieve 5 Gbit/s data rate, USB 3.0 includes two high-speed unidirectional differential pairs. USB 3.0 also includes a legacy USB 2.0 480 Mbit/s differential pair cable, thereby maintaining backward compatibility. In other words, the proposed USB 3.0 standard comprises USB 2.0 plus at least two additional unidirectional differential pairs operating at about 5 Gbit/s.

In contrast to USB, HDMI utilizes one differential pair for a pixel clock and three differential pairs for pixel data (typically one pair for red, green and blue data). MHL is based on HDMI, but reduces the pin count by sending all color components on one differential pair. As a result, the pin count for MHL is 5 (e.g., two pins for pixel clock, two pins for pixel data, and 1 pin for ground) compared to 19 for HDMI, while having the capability of handling all the formats that are required by HDMI. The bit rate needed for the pixel data (assuming a typical full HD resolution of 1920×1080p at 60 Hz with 24 bits per pixel) is about 3 Gbit/s. The pixel clock frequency used in HDMI (and hence also used in MHL) depends on the resolution and vertical frequency and is one of 27 MHz, 74.25 MHz 165 MHz, or 340 MHz. These are the most common pixel frequencies, but as will be appreciated, others are possible.

The data port in accordance with the invention can use a common set of pins and/or input/output circuitry for both USB 3.0 and MHL operation (or some other standard). This can be accomplished, for example, by multiplexing or switching the logic for the respective data transfer standards among the common set of pins and/or circuits.

FIG. 1 is a simple block diagram illustrating switching between USB and MHL standards, wherein USB 3.0 logic 2 and MHL logic 4 are coupled to a single electrical connector 6 via multiplexer 8 (also referred to as switch 8) and data I/O circuitry 9. More particularly, the legacy differential pair included in the USB 3.0 standard (for backwards compatibility with USB 2.0), which has a maximum speed of 480 Mbit/s, can be used for the MHL pixel clock, which has a maximum speed requirement of 340 Mbit/s. Further, one of the two new differential pairs included in the USB 3.0 standard (which have a maximum speed of 5 Gbit/s) can be used for the MHL pixel data (which typically has a maximum speed requirement of 3 Gbit/s, although higher speeds are possible for higher frame rates and/or deep color). Thus, via selective switching between the appropriate logic, both USB 3.0 and MHL can be supported on a common data port, thereby minimizing the number of receptacles and/or pins on the electronic device. Further details regarding the switching of both USB 3.0 and MHL are discussed below with respect to FIGS. 4 and 5.

Figure 2:
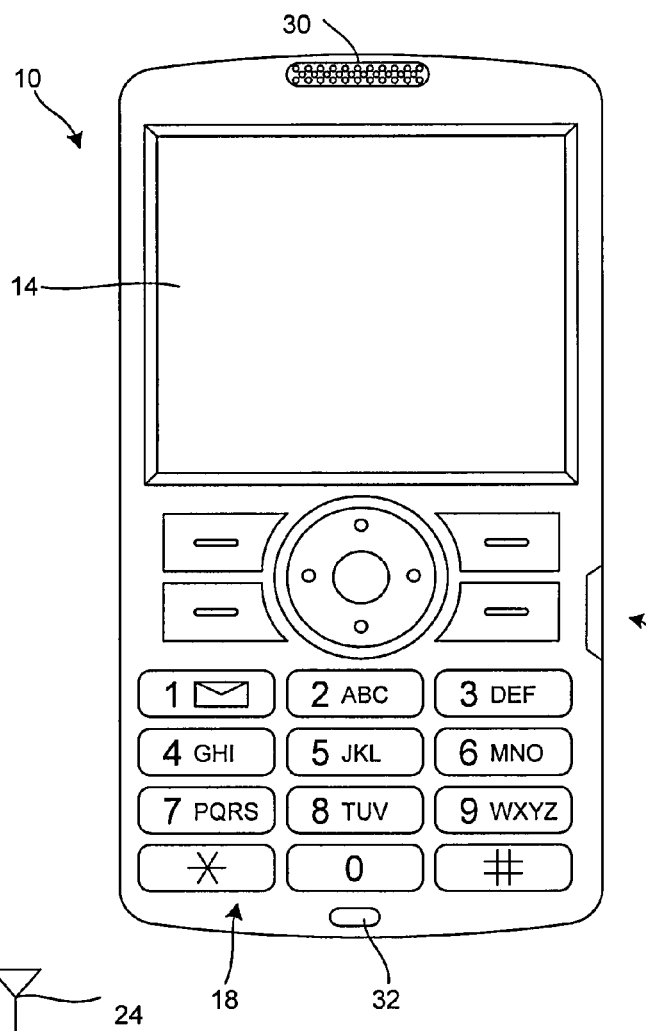
FIG. 2 is a schematic view of a mobile telephone as an exemplary electronic device in accordance with an embodiment of the present invention.
Figure 3:
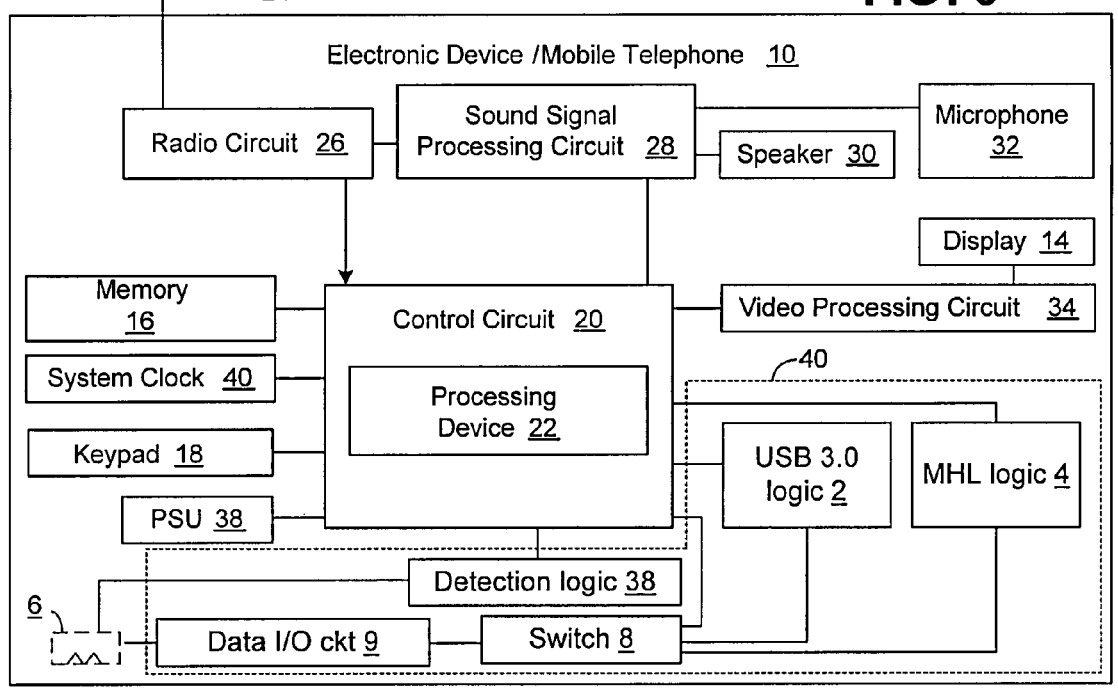
FIG. 3 is a schematic block diagram of the relevant portions of the mobile telephone of FIG. 2 in accordance with an embodiment of the present invention.

Referring now to FIGS. 2 and 3, an electronic device 10 is shown. The electronic device of the illustrated embodiment is a mobile telephone and will be referred to as the mobile telephone 10. The mobile telephone 10 is shown as having a brick or block form factor, although other form factors, such as a "flip-open" form factor (e.g., a "clamshell" housing) or a slide-type form factor (e.g., a "slider" housing) also my be utilized.

The mobile telephone 10 may include a display 14. The display 14 displays information to a user such as operating state, time, telephone numbers, contact information, various navigational menus, etc., which enable the user to utilize the various features of the mobile telephone 10. The display 14 also may be used to visually display content received by the mobile telephone 10 and/or retrieved from a memory 16 (FIG. 3) of the mobile telephone 10.

A keypad 18 provides for a variety of user input operations. For example, the keypad 18 typically includes alphanumeric keys for allowing entry of alphanumeric information such as telephone numbers, phone lists, contact information, notes, etc. In addition, the keypad 18 typically includes special function keys such as a "call send" key for initiating or answering a call, and a "call end" key for ending or "hanging up" a call. Keys or key-like functionality also may be embodied as a touch screen associated with the display 14.

The mobile telephone 10 includes call circuitry that enables the mobile telephone 10 to establish a call and/or exchange signals with a called/calling device, typically another mobile telephone or landline telephone. However, the called/calling device need not be another telephone, but may be some other device such as an Internet web server, content providing server, etc. Calls may take any suitable form. For example, the call could be a conventional call that is established over a cellular circuit-switched network or a voice over Internet Protocol (VoIP) call that is established over a packet-switched capability of a cellular network or over an alternative packet-switched network, such as WiFi (e.g., a network based on the IEEE 802.11 standard), WiMax (e.g., a network based on the IEEE 802.16 standard), etc.

FIG. 3 represents a functional block diagram of the mobile telephone 10. For the sake of brevity, generally conventional features of the mobile telephone 10 will not be described in great detail herein.

The mobile telephone 10 includes a primary control circuit 20 that is configured to carry out overall control of the functions and operations of the mobile telephone 10. The control circuit 20 may include a processing device 22, such as a CPU, microcontroller or microprocessor. The processing device 22 executes code stored in a memory (not shown) within the control circuit 20 and/or in a separate memory, such as the memory 16, in order to carry out operation of the mobile telephone 10. The memory 16 may include a read only memory area that is implemented using nonvolatile memory, and a random access or system memory area that is implemented using volatile memory.

Continuing to refer to FIGS. 2 and 3, the mobile telephone 10 includes an antenna 24 coupled to a radio circuit 26. The radio circuit 26 includes a radio frequency transmitter and receiver for transmitting and receiving signals via the antenna 24 as is conventional. The radio circuit 26 may be configured to operate in a mobile communications system and may be used to send and receive data and/or audiovisual content. Receiver types for interaction with a mobile radio network and/or broadcasting network include, but are not limited to, GSM, CDMA, WCDMA, GPRS, WiFi, WiMax, DVB-H, ISDB-T, etc., as well as advanced versions of these standards.

The mobile telephone 10 further includes a sound signal processing circuit 28 for processing audio signals transmitted by and received from the radio circuit 26. Coupled to the sound processing circuit 28 are a speaker 30 and a microphone 32 that enable a user to listen and speak via the mobile telephone 10 as is conventional. The radio circuit 26 and sound processing circuit 28 are each coupled to the control circuit 20 so as to carry out overall operation. Audio data may be passed from the control circuit 20 to the sound signal processing circuit 28 for playback to the user. The sound processing circuit 28 may include any appropriate buffers, decoders, amplifiers and so forth.

The display 14 may be coupled to the control circuit 20 by a video processing circuit 34 that converts video data to a video signal used to drive the display 14. The video processing circuit 34 may include any appropriate buffers, decoders, video data processors and so forth. The video data may be generated by the control circuit 20, retrieved from a video file that is stored in the memory 16, derived from an incoming video data stream that is received by the radio circuit 28 or obtained by any other suitable method.

The mobile telephone 10 also may include a system clock 40 for clocking the various components of the mobile telephone 10, such as the control circuit 20. The control circuit 20 may, in turn, carry out timing functions, such as timing the durations of calls, generating the content of time and date stamps, and so forth.

The mobile telephone 10 may further include one or more receptacles 6, which may be in the form of standard or proprietary mobile telephone receptacle and may include one or more electrical connectors. The receptacle 6 may serve to connect the mobile telephone 10 to a personal computer or other device via a data cable for the exchange of data. In the exemplary embodiment, the receptacle 6 is a USB 3.0 compatible receptacle.

Detection logic 38 is operatively coupled to the receptacle 6 and the control circuit 20. The detection logic 38 is operative to determine if a connector inserted into the receptacle 6 is of a first type (e.g., a connector for use with USB data transfer) or of a second type (e.g., a connector for use with MHL data transfer). When the detection logic 38 determines the type of connector, this information is communicated to the control circuit 20.

A data I/O circuit 9 is also coupled to the receptacle 6 and may comprise any conventional means for transferring data between devices. In the exemplary embodiment shown in FIG. 3, the data I/O circuit 9 comprises circuitry compatible with both the USB 3.0 and MHL standards. In other words, the data I/O circuit 9 includes circuitry for driving at least one USB 2.0 compliant differential pair, and at least two 5 Gbit/s differential pairs.

Additionally, USB 3.0 logic 2 and MHL logic 4 are communicatively coupled to the control circuit 20, wherein the control circuit 20 is operative to provide data to and/or receive data from the USB and MHL logic 2 and 4. Further, the USB logic 2 and MHL logic 4 are operatively coupled to a switch 8, and an output or outputs of switch 8 are operatively coupled to the data I/O circuit 9. The switch 8 is also operatively coupled to the control circuit 20 so as to enable the control circuit 20 to select the USB logic 2 or the MHL logic 4 to control the data I/O circuit 9.

It is noted that although USB 3.0 and MHL logic are shown in FIG. 3, other types of logic circuitry may be utilized without departing from the scope of the invention. Further, although only a single switch 8 is shown, the electronic device may comprise a plurality of switches. The switch 8 may be a conventional digital switch having at least two data inputs, at least one address or "select" input, and an output. Based on a state of the select input, one of the at least two data inputs is communicatively coupled to the output. Also, while the logic is shown as being implemented via hardware circuits, the logic functions may be implemented via software, as discussed with respect to FIG. 5.

Figure 4:
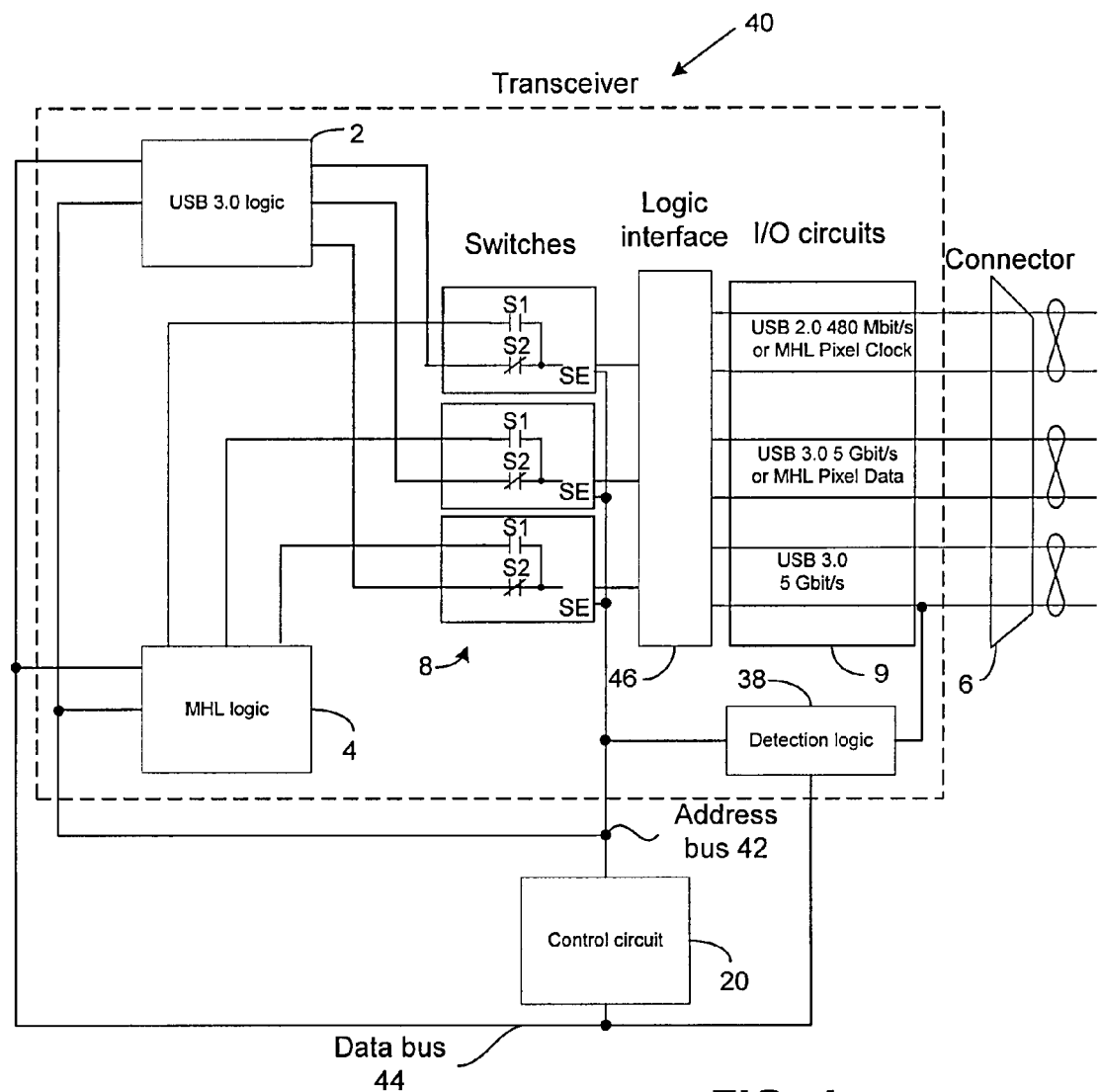
FIG. 4 is a block diagram illustrating an exemplary configuration of a transceiver that employs a multi-function data port in accordance with the invention.

With further reference to FIG. 4, an exemplary layout of the respective circuits in accordance with an embodiment of the invention is shown in more detail. In the example of FIG. 4, the functionality of the data port in accordance with the invention is implemented in a transceiver 40 formed on a single chip. However, the circuitry may be embodied on multiple chips and/or at least partially in software.

The exemplary transceiver 40 includes the aforementioned USB 3.0 logic 2 and the MHL logic 4, each of which are operatively coupled to the control circuit 20 (which may or may not be formed on the same chip) via address bus 42 and data bus 44. The USB 3.0 logic 2 and the MHL logic 4 may be implemented on the transceiver 40 in accordance with the USB 3.0 and MHL standards.

The USB 3.0 logic 2 and the MHL logic 4 include I/O points for communicating with the data I/O circuit 9, and these I/O points are operatively coupled to switches 8. For example, I/O points of the MHL logic 4 may be coupled to a first input bank of switch 8, and I/O points of the USB 3.0 logic 2 may be coupled to a second input bank of switch 8. Further, an address input (a select input) for selecting between the first bank or the second bank of the switch 8 (thereby selecting between MHL and USB operations) is coupled to the control circuit 20 via the address bus 42.

Outputs from the switch 8 are coupled to a logic interface 46 of the data I/O circuit 9. The logic interface 46 may include the appropriate buffers, amplifiers, decoders, etc. to enable the USB and MHL logic 2 and 4 to interface with and control the data I/O circuit 9. The data I/O circuit 9, which may include a predefined number of channels for communicating data, is coupled to the terminals (not shown) of the receptacle 6. Each channel of the data I/O circuit 9 may include the appropriate amplifiers, filters, regulators, etc. for providing the actual voltage and/or current signals (which represent the data signals) to the terminals of the receptacle 6.

Further, detection logic 38 is coupled to the receptacle 6. As noted above, the detection logic 38 is operative to determine the type of connector inserted in the receptacle 6.

In operation, the detection logic 38 monitors the receptacle 6, for example, by measuring an impedance between two terminals of the receptacle (e.g., the detection logic can include an impedance measurement circuit). If an open circuit is detected, or if the impedance does not match a predetermined impedance, then the detection logic 38 can conclude that a first type of connector (e.g., a USB 2.0 or 3.0 connector) is inserted in the receptacle 6. If, on the other hand, an open circuit is not detected, or if the impedance matches a predetermined impedance (e.g., a 10 k ohm impedance) then the detection logic 38 can conclude that a second type connector (e.g., an MHL connector) is inserted in the receptacle 6. The type of connector as determined by the detection logic 38 then is communicated to the control circuit 20 via the data bus 44.

Based in the connector inserted in the receptacle 6 (as detected by the detection logic 38), the control circuit 20 communicates the appropriate data to the USB logic 2 and/or the MHL logic 4 via the address bus 42 and data bus 44. This data can include, for example, address information as well as data to be transmitted to and/or received from a device coupled to the receptacle 6. Further, the control circuit 20, based on the connector inserted into the receptacle (as detected by the detection logic 38), commands the switch 8 (e.g., via the address bus 42) to select the appropriate input bank (e.g., either the USB logic 2 or the MHL logic 4) for communication with the logic interface 46.

The USB logic 2 and/or MHL logic 4 process the data provided by the control circuit 20 and based on the processed data, communicate information with the control circuit 20 (e.g., via data bus 44). Further, the USB logic 2 or MHL logic 4 communicate with the logic interface 46 via switch 8 so as to provide information that enables transmission and reception of data via the data I/O circuit 9 in accordance with the specific standard. More specifically, the logic interface 46 translates the information from the USB and MHL logic 2 and 4 into a format used by the data I/O circuits 9, and vice versa.

Figure 5:
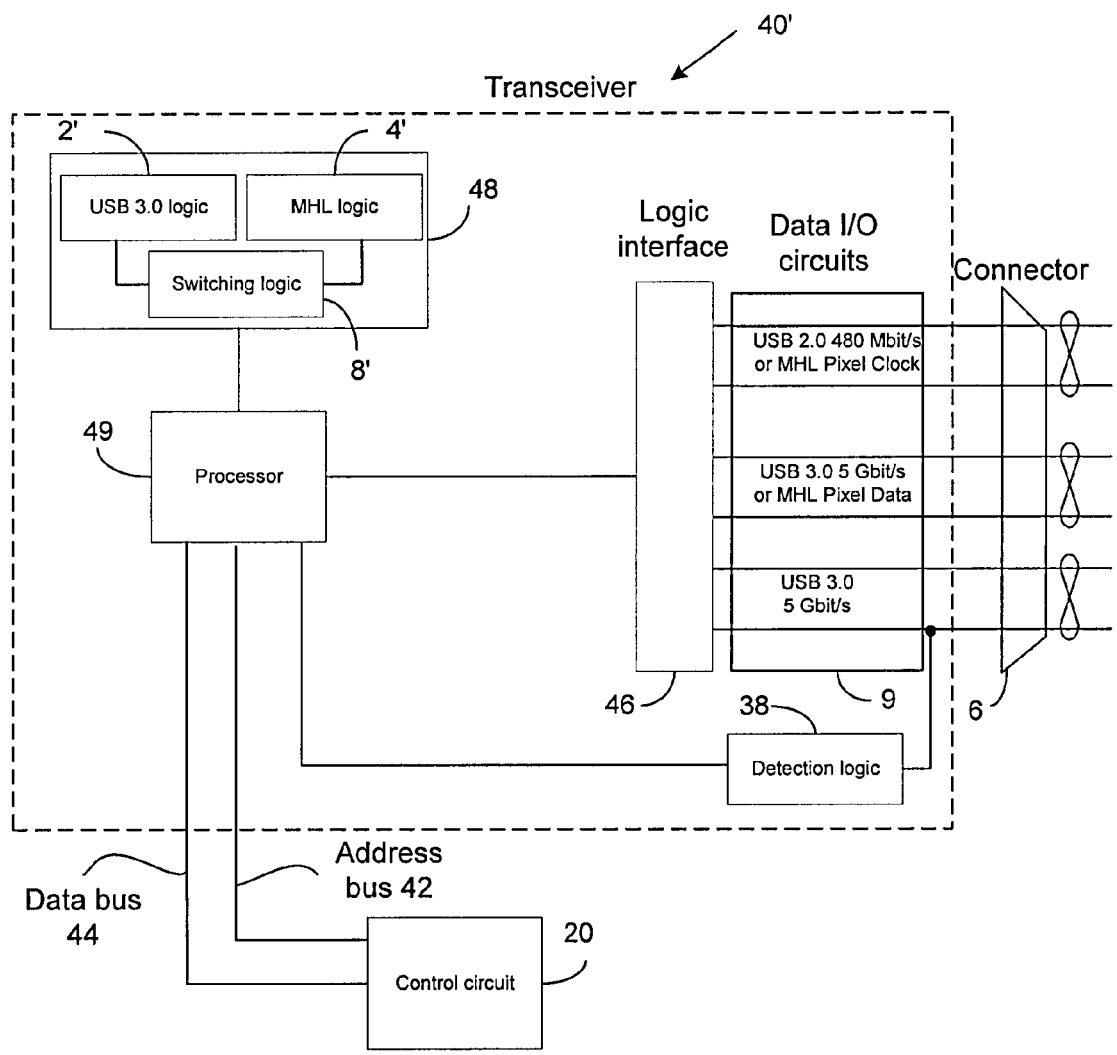
FIG. 5 is a block diagram illustrating another exemplary configuration of a transceiver that employs a multi-function data port in accordance with the invention.

In another embodiment, a transceiver 40' includes USB 3.0 logic, MHL logic, and switching logic, which are functionally implemented by a processor executing code stored in memory. FIG. 5 illustrates this embodiment, wherein memory 48, such as non-volatile memory, includes USB 3.0 logic 2', MHL logic 4' and switching logic 8' stored therein. The logic may be thought of as computer code that is executable by a processor or the like, and may take the form of computer code or the like. A processor 49 or the like is coupled to the memory 48 and can execute the logic stored therein so as to implement the functionality of the data port in accordance with the invention. The processor 49 is coupled to the control circuit 20 via address bus 42 and data bus 44.

In operation, the data port of FIG. 5 provides substantially the same functionality as the data port of FIG. 4. However, this functionality is carried out via computer code executed by a processor 49. For example, the detection logic 38 can provide information regarding the connector inserted into the receptacle 6 as described with respect to FIG. 4. Instead of providing this information to the control circuit 20, however, the information is provided to the processor 49.

The processor 49, based on the connector information as provided by the detection logic 38, can selectively retrieve from memory 48 either the USB logic 2' or the MHL logic 4' for execution. In this sense, the switching logic 8' is the "selective retrieval" of either the USB 3.0 logic 2' or the MHL logic 4' from memory 48.

Once the appropriate logic has been retrieved from memory 48, the processor 49 carries out instructions as detailed in the retrieved logic. In particular, if USB logic 2' is selected and retrieved, then the processor provides data to the logic interface 46 in the standard USB 3.0 format. In accordance therewith, a USB 2.0 legacy circuit is controlled in accordance with the USB 2.0 standard, and two USB 3.0 high speed circuits are controlled in accordance with the USB 3.0 standard. If MHL logic 4' is selected, then the processor 49 provides data to the logic interface 46 in the standard MHL format. More particularly, the legacy USB 2.0 circuitry of the data I/O circuit 9 is provided pixel clock data, while at least one of the USB 3.0 high speed circuits are provided with pixel data. The remaining portions of the transceiver 40' (i.e., the logic interface 46 and data I/O circuit 9) operate as described with respect to FIG. 4.

In the above manner, a single data port may provide data transfer capabilities in accordance with two different communication standards. For example, if a USB cable is detected in the receptacle 6, the USB 3.0 logic is placed in control of the data I/O circuit 9, and data may be communicated in accordance with the USB standard. If an MHL cable is detected in the receptacle 6, then the MHL logic 4 is placed in control of the data I/O circuit 9, and data may be communicated in accordance with the MHL standard. This minimizes the number of terminals and/or receptacles used on the electronic device, thereby reducing costs and improving connectivity.

Figure 6:
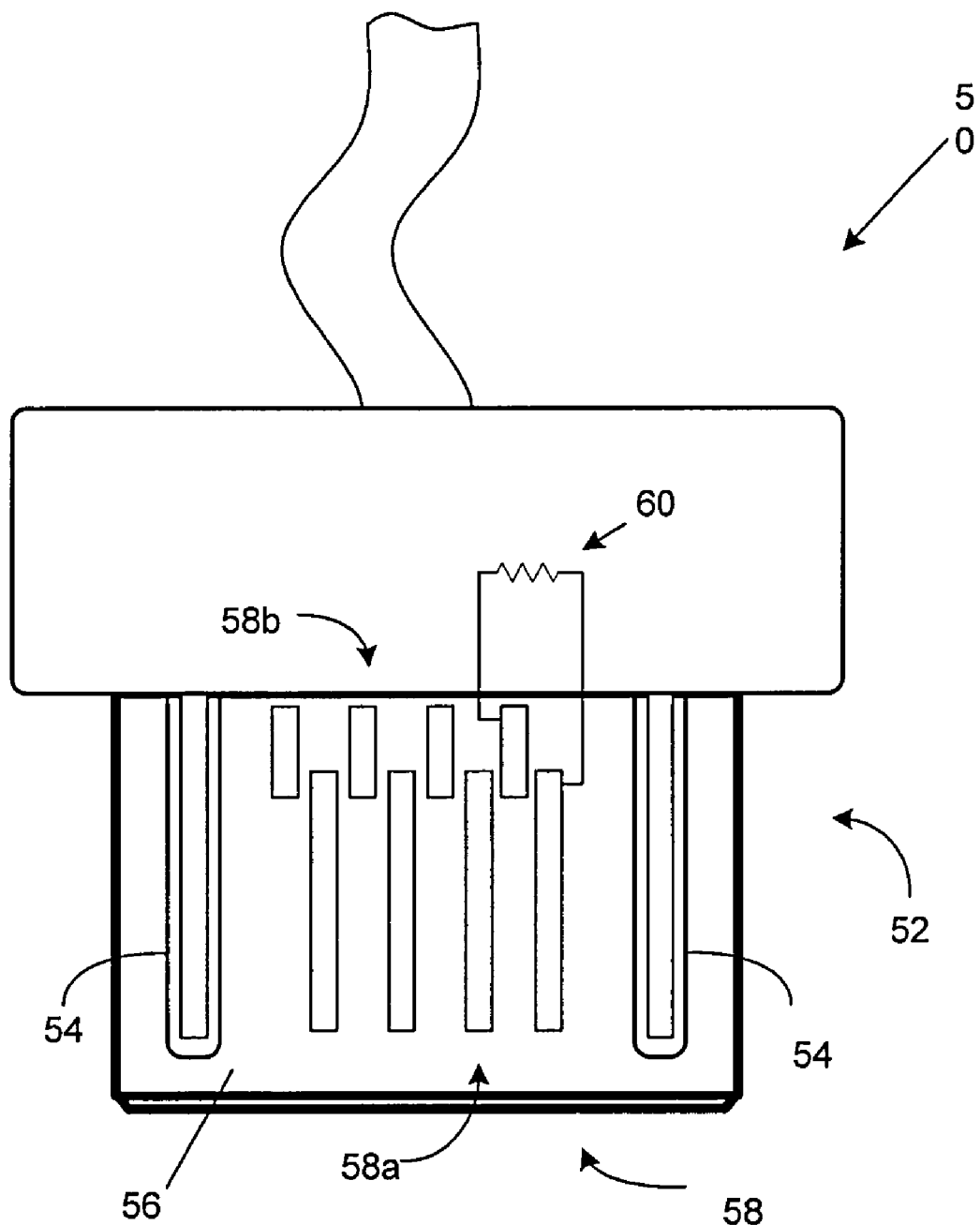
FIG. 6 is a schematic diagram of an exemplary cable and connector that may be used with the data port in accordance with the invention.

Moving now to FIG. 6 there is shown an exemplary cable 50 that may be used with the data port in accordance with the present invention. The cable 50 includes a first connector 52 that is configured to engage the receptacle 6 of the mobile telephone 10. The exemplary connector 52 has a generally rectangular shape (although other shapes are possible), and may include elongated guides 54 that cooperate with corresponding grooves (not shown) in the receptacle 6. The guides 54 ensure that the connector 52 is properly inserted into the receptacle 6. Although not shown, the cable 50 includes a second connector configured to interface with another device. The second connector may have the same configuration as the first connector, or it may have a different configuration.

Arranged along a top face 56 of the first connector 52 is a plurality of terminals 58. In the exemplary embodiment, eight terminals are shown, wherein a first set of terminals 58a are arranged to correspond to the USB 2.0 standard (i.e., Vcc, GND, D+ and D−). A second set of terminals 58*b* comprise two differential pairs (D$_1$+, D$_1$−, D$_2$+, D$_2$−), and may be arranged to correspond to the USB 3.0 standard. Further, an impedance 60 (e.g., a resister) is coupled between two of the plurality of terminals, and this impedance can be measured by the electronic device 10 to determine the type of connector (i.e., the data format) of the cable (e.g., an infinite impedance can represent a first cable type, and a preset impedance (e.g., 10 k ohms) can represent a second cable type).

A person having ordinary skill in the art of computer programming and applications of programming for mobile phones would be able in view of the description provided herein to program a mobile phone 10 to operate and to carry out the functions described herein. Accordingly, details as to the specific programming code have been omitted for the sake of brevity. Also, while software in the memory of the mobile phone 10 may be used to allow the mobile phone to carry out the functions and features described herein in accordance with the preferred embodiment of the invention, such functions and features also could be carried out via dedicated hardware, firmware, software, or combinations thereof, without departing from the scope of the invention.

Specific embodiments of the invention have been disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A portable electronic device, comprising:
   a data input/output (I/O) circuit for communicating data to/from the electronic device, said data I/O circuit including a USB 2.0 channel, and second and third USB 3.0 channels;
   a first logic operative to control the data I/O circuit in accordance with a first data transfer standard, wherein said first data transfer standard is based on the USB 3.0 standard;
   a second logic different from the first logic and operative to control the data I/O circuit in accordance with a second data transfer standard, wherein said second data transfer standard enables high-definition video communication exchange with said portable electronic device;
   and a switching logic operative to selectively couple said first logic or said second logic to said data I/O circuit so as to enable operation of said data I/O circuit in accordance with the first data transfer standard or the second data transfer standard, wherein when the second logic is selected, the USB 2.0 channel is configured as a pixel clock channel in accordance with said second data transfer standard, and at least one of the second or third USB 3.0 channels is configured as a pixel data channel in accordance with said second data transfer standard.

2. The device according to claim 1, further comprising:
   a control circuit operatively coupled said switch;
   a receptacle operatively coupled to said data I/O circuit; and
   a detection circuit operatively coupled to said receptacle and said control circuit, wherein said detection circuit is configured to detect a type of connector coupled to said receptacle and to communicate the connector type to the control circuit, and said control circuit is operative to command the switching logic to select the first logic or the second logic based on the connector type.

3. The device according to claim 2, further comprising a logic/driver interface circuit coupled between said switching logic and said data I/O circuit, wherein said logic/driver interface translates data from a first format to a second format different from the first format.

4. The device according to claim 2, wherein said receptacle includes at least two conductors coupled to said data I/O circuit, and said detection circuit includes an impedance measurement circuit configured to measure an impedance between the at least two conductors, wherein the detection circuit determines the connector type based on the measured impedance.

5. The device according to claim 1, wherein said switching logic comprises a digital switch.

6. The device according to claim 1, wherein said switching logic comprises software logic operative to select either the first logic or the second logic to control the data I/O circuit.

7. The device according to claim 1, wherein said switching logic comprises a first input, a second input, and an output, said first input operatively coupled to said first logic, said second input operatively coupled to said second logic, and said output operatively coupled to said data I/O circuit.

8. The device according to claim 7, said switching logic further including a select input operative to selectively couple the first input or the second input to the output.

9. The device according to claim 1, wherein said data I/O circuit comprises at least three channels, each channel configured as a differential pair.

10. The device according to claim 1, further comprising call circuitry for establishing two-way wireless communications.

11. The device according to claim 1, wherein the electronic device is at least one of a mobile phone, pager, electronic organizer, personal digital assistant, or smartphone.

12. The device according to claim 1, wherein said data I/O circuit, first logic, second logic and switching logic are formed on the same chip.

13. A method of using a universal serial bus (USB) 3.0 data port to transfer data in accordance a first data transfer standard and a second data transfer standard, the first and second data transfer standards different from one another, said data port including a legacy USB 2.0 data transfer circuit, and first and second USB 3.0 data transfer circuits, the method comprising:

in the first data transfer standard, using the legacy USB 2.0 data transfer circuit of the USB 3.0 data port and the first and second USB 3.0 data transfer circuits of the USB 3.0 data port in accordance with the USB 3.0 standard when a connector inserted in the data port is a USB connector;

and in the second data transfer standard, using the legacy USB 2.0 data transfer circuit of the USB 3.0 data port as a pixel clock circuit in accordance with the second data transfer standard, said second data transfer standard enabling high definition video communication exchange, and using at least one of the first and second USB 3.0 data transfer circuits of the USB 3.0 data port as a pixel data circuit in accordance with said second data transfer standard when the connector inserted in the data port is an MHL connector.

14. The method according to claim 13, further comprising determining if the connector inserted into the data port is a USB connector or a mobile high-definition link (MHL) connector.

15. A method of using a data port to transfer data in accordance with two different data transfer standards, said data port including a data input/output (I/O) circuit for data signals having a USB 2.0 channel, and first and second USB 3.0 channels, the method comprising:

configuring the data I/O circuit in accordance with a first data transfer standard based on the USB 3.0 standard when a connector inserted in the data port is a connector associated with the first data transfer standard, said configuring in accordance with the first data transfer standard including using the USB 2.0 channel and first and second USB 3.0 data transfer circuits in accordance with the USB 3.0 standard;

and configuring the data I/O circuit in accordance with a second data transfer standard that enables high-definition video communication exchange when the connector inserted in the data port is a connector associated with the second data transfer standard, said configuring in accordance with the second data transfer standard including using the USB 2.0 channel as a pixel clock channel in accordance with said second data transfer standard, and using at least one of the first or second USB 3.0 data transfer circuits as a pixel data channel in accordance with said second data transfer standard.

16. The method according to claim 15, wherein said determining includes measuring an impedance between terminals of the connector and, based on the measured impedance, concluding that the connector is a USB connector or an MHL connector.

\* \* \* \* \*